United States Patent
DeBenedictis et al.

(10) Patent No.: US 9,325,718 B2
(45) Date of Patent: Apr. 26, 2016

(54) SYSTEM AND METHOD FOR COMMUNICATIONS ROUTING

(71) Applicants: Christopher J. DeBenedictis, Branford, CT (US); Albert R. Subbloie, Jr., Orange, CT (US); Paul Schmidt, Rocky Hill, CT (US); Charles Gamble, Woodbridge, CT (US)

(72) Inventors: Christopher J. DeBenedictis, Branford, CT (US); Albert R. Subbloie, Jr., Orange, CT (US); Paul Schmidt, Rocky Hill, CT (US); Charles Gamble, Woodbridge, CT (US)

(73) Assignee: TANGOE, INC., Orange, CT (US)

( * ) Notice: Subject to any disclaimer, the term of this patent is extended or adjusted under 35 U.S.C. 154(b) by 0 days.

(21) Appl. No.: 14/181,084

(22) Filed: Feb. 14, 2014

(65) Prior Publication Data

US 2015/0040244 A1 Feb. 5, 2015

Related U.S. Application Data

(60) Provisional application No. 61/862,146, filed on Aug. 5, 2013.

(51) Int. Cl.
*H04L 12/707* (2013.01)
*G06F 21/60* (2013.01)
*H04L 29/06* (2006.01)

(52) U.S. Cl.
CPC ............ *H04L 63/102* (2013.01); *H04L 63/166* (2013.01)

(58) Field of Classification Search
CPC ...... H04L 45/22; H04L 63/102; G06F 21/606
USPC ........................................................ 726/27
See application file for complete search history.

(56) References Cited

U.S. PATENT DOCUMENTS

| | | | | |
|---|---|---|---|---|
| 7,263,545 | B2 * | 8/2007 | Digate et al. .................. | 709/206 |
| 7,373,428 | B1 * | 5/2008 | Armstrong et al. ........... | 709/249 |
| 2004/0132438 | A1 * | 7/2004 | White ........................... | 455/418 |
| 2005/0144333 | A1 * | 6/2005 | Kotzin ........................... | 710/15 |
| 2006/0075091 | A1 * | 4/2006 | Beyda et al. .................. | 709/224 |
| 2006/0230002 | A1 * | 10/2006 | Bennett et al. ................ | 705/412 |
| 2011/0113488 | A1 * | 5/2011 | Schultz et al. ................. | 726/21 |
| 2011/0258265 | A1 * | 10/2011 | Reeves et al. ................. | 709/206 |

FOREIGN PATENT DOCUMENTS

WO     0242923  A1    5/2002

OTHER PUBLICATIONS

Telecom Benchmarking—Telecom Benchmark Full Circle Group <http://www.fullcirclegroup.com.au/market-solutions/telecommunications-benchmark> pp. 3.

* cited by examiner

*Primary Examiner* — Saleh Najjar
*Assistant Examiner* — Oleg Korsak
(74) *Attorney, Agent, or Firm* — St Onge Steward Johston and Reens LLC

(57) ABSTRACT

Provided is a system which allows a user to efficiently locate and contact those individuals the user would like to communicate with. The system can also collect or access data about users in order to determine the best contact point to use at a particular time. Some of the data may include information pertaining to a user's appointments, schedule, activities, location and/or contact point usage. The system can monitor the data and may determine an individual's usage patterns in order to select or suggest contact points that are the best to contact a particular user at a particular time. The system may also determine or receive settings that allow for the routing of communications to particular contact points based on how the user receiving the communication would prefer to be contacted. Further, the system may securely route sensitive communications and prevent or limit forwarding of the sensitive information.

37 Claims, 7 Drawing Sheets

SYSTEM AND METHOD FOR COMMUNICATIONS ROUTING

FIELD OF THE INVENTION

The present invention relates to a system for routing communications according to usage history and preferences.

BACKGROUND OF THE INVENTION

As companies and individuals strive to communicate better both within the company and to customers, individuals increasingly have more and more contact points. For example, one person may have multiple e-mail accounts, a work phone number, a home phone number, a mobile phone number, multiple calendars, and multiple social networking accounts. With all these contact points, it can be difficult to determine the best way to connect. This problem becomes exacerbated when attempting to contact multiple people to arrange a meeting or to collaborate on a project.

At the same time, individuals may prefer to be contacted using a specific contact point depending on the time of day and what that individual is actively working on. For example, if the individual is in a meeting, but is able to respond quickly to a text message, it may be best to send that individual a short text or email message. Presently when contacting someone in a meeting, one may call a mobile phone number only to get the individual's voice mail, and rather than leaving a voice message, one may send a text or email. This process may be repeated a number of times until all parties are available, which results in an unnecessary back and forth that generally wastes time.

SUMMARY OF THE INVENTION

Therefore, it is an object of the present invention to provide a system for routing communications that reduces unnecessary and/or missed communications.

Another object of the present invention is to efficiently aid individuals in contacting other individuals or groups.

Another object of the present invention is to allow a user to determine and set preferences on how to be contacted Still another object of the present invention is to provide a system that provides a way to securely communicate sensitive information to individuals or groups.

Therefore, the present system may allow a user to efficiently locate and contact those individual(s) the user would like to communicate with. The system may also collect or access data about users in order to determine the best contact point to use at a particular time. Some of the data collected or accessed may include but is not limited to information pertaining to a user's appointments, schedule, activities, location and contact point usage. The system monitors the collected or accessed data and may determine an individual's usage patterns in order to determine which contact points are the best to contact a particular user at a particular time. The system may also determine or receive settings that allow for the routing of communications to particular contact points based on how the user receiving the communication would prefer to be contacted. Further, the system may securely route sensitive communications and prevent or limit forwarding of the sensitive information.

As used herein, the following definitions shall apply.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The term "user" is used to designate a person or persons, respectively, who access the system in any manner, whether alone or in one or more groups, whether in the same or various places, and whether at the same time or at various different times. As will be understood below, "the user" indicates one person and "the first user" may indicate a person different than "the user." Likewise "first user" and "second user" indicate different individuals and "first user contact point" indicates a particular contact point such as, for example, desk phone, home phone, mobile phone, e-mail, text, instant messaging etc, where the "first user contact point" is associated with the first user.

The terms "first" and "second" are used to distinguish one element, set, data, object or thing from another, and are not used to designate relative position or arrangement in time. In some cases as used below, the "first user" may initiate or create the contact request, and the "second user" or "the user" may be the individual the first user is trying to communicate with. It is understood that in some cases, the second user may initiate the contact request and the first user may be the individual the second user is trying to communicate with. The term "best chance" as used herein may not designate a specific probability or a specific threshold of probability. Although best chance could refer to a probability greater than 50% that a user is available at a particular contact point, it should be understood that best chance may also refer to a relative probability. For example, if the chances that a specific contact point is available is only 10%, but other contact points have a lower chance of availability such as 5%, the contact point with the 10% chance of availability may be considered the contact point with the best chance as it is more probable than other contact points to be available. The specific percentages referenced above are exemplary only and not limiting.

The term "preferences" or more particularly, "user contact preferences" as used herein designates how a user would like to be contacted at different contact points. It is understood that this term encompasses when a company or other entity decides or designates how the company would prefer their users (employees) to be contacted.

As discussed below, a user may preferences by creating rules within the system that restrict or allow certain communications based on how the user wishes to communicate and who or what type of individual the user wishes to communicate with. In other instances, the preferences may be set by the system based on the user's pattern of communications, for example how the user interacts and communicates with others, or what devices or contact points the user prefers given a set of scenarios, including the cost of the connections. For example when a user is roaming on a cellular network with high costs, lower cost contact points may also be more heavily weighted in the determination of which communication point to choose. The system may also be designed to automatically forward certain communications based on cost. For example, if a user is roaming on their cell network and another voice communication contact point is active, the system may be configured to forward a call to a mobile phone directly to a "voice over internet protocol" system. For example, the voice and/or video conferencing system known as Skype®.

Rules may be generated by the system based on the evolution of how the user interacts and communicates with others. In some cases, if two contact points have an equal probability of availability and the equal probability is the highest (best chance), it would be understood that preferences can control how the system chooses between contact points with an equal probability, where the equal probability is the (best chance). The user initiating the contact request may also be presented with the choice between two equally probable contact points.

Therefore, in one aspect, a system is provided for routing communications from a first user to at least a second user. The system may include a system computer having a network connection and an interface module associated with the system computer allowing the first user to access said system computer with a user computer. A contact module may be associated with the system computer and the contact module may receive a contact request from the user computer. The contact request may identify at least a second user to be contacted. An activity module associated with the system computer may receive second user data which is indicative of contact points that can be used to contact the second user at a particular time. The user data may also be indicative of an activity status, which may indicate that a user is actively using a particular contact point at a particular time. A comparison module associated with said system computer may compare the contact request and the second user data to determine which second user contact point has the best chance to be available for the first user use to communicate with the second user.

The system may further include a preferences module associated with the system computer. The preferences module may receive user contact data associated with at least one second user contact point wherein the user contact data is indicative of the second user's contact preferences for the at least one second user contact point. The comparison module may compare the user contact data to the contact request and the second user data.

The comparison module may determine a probability for a plurality of second user contact points, the probability indicative of the chance that the second user is available to be contacted at the particular second user contact point. The system may further present to the first user a list of contact points based on the probabilities. The activity module may receive activity data indicative of an activity status of at least one first user contact point. The comparison module may transmit the first communication to the second user contact point when the activity status of the second user contact point and the activity status of the first user contact point both indicate that the second and first users respectively are actively using their respective contact points.

The system may further include a communication module receiving a selection of at least one contact point for connecting the first user to the second user. The user computer and the system computer may be in communication via the network. The contact request may be indicative of at least one contact type that the first user would like to use to connect with the second user. At least one of the contact types may be selected from the group consisting of: phone, voice, e-mail, instant message, video conference, sms, mms and social media. The activity module may generate a pattern from the second user data, the pattern indicative of how and when one user uses contact points to communication with other users; and said comparison module compares the pattern to the contact request to determine which second user contact point is available.

In other aspects a system for routing communications may include a system computer; software executing on the system computer for receiving user data which is indicative of contact points that can be used to contact each user at a particular time; software executing on the system computer for receiving a contact request for contacting at least one of the users; and software executing on the system computer for comparing a contact request with the user data to determine which of the plurality of contact points for the user can be used to contact the user at a select time.

The system may include software executing the system computer for receiving user contact data which is associated with a plurality of contact points, each contact point associated with at least one user, the user contact data indicative of contact preferences of each user, wherein the contact data includes a user contact preferences indicative of a user's preferences associated with at least one contact point. The software for comparing the contact request with the user data may further be for comparing the contact request to the user contact preferences to determine which of the plurality of contact points can be used to contact the user at the select time.

The system may include software executing on the system computer for generating a notification for transmission to at least one of the users; and software executing on the system computer for receiving a selection in response to each notification, each selection indicative of a contact point that is available to be used to contact one of the users at the select time.

One of the users may be a first user, the first user may initiate the contact request. The user data may include first user data, which is indicative of contact points that can be used to contact the first user at a select time. The system may further include software executing on the system computer for comparing the contact request with the user data to determine which contact points for both the first user and the user are active and can be used to allow the first user and the user to contact each other at the select time.

The system may further include software executing on the system computer for receiving client user data which is indicative of first user contact points that can be used to contact a client at the select time. The system may also include software executing on the system computer for automatically selecting a user contact point and a first user contact point, wherein the user contact point has an activity status indicating that the user is available at the user contact point and the first user contact point has an activity status indicating that the first user is available at the first user contact point.

The contact format may be selected from the group consisting of: voice, video, instant message, social media, e-mail, MMS, and text. The system may further include software executing on the system computer for receiving a type selection indicative of at least one type of contact point. The system may include software executing on the system computer for receiving a communication. The system may also include software executing on the system computer for comparing the user data to the category selection and for transmitting the communication to one of the contact points associated with the type of the type selection.

The communication may be transmitted to the one of the contact points according a user contact preferences, the user contact preferences may be indicative of a user's preferences associated with at least one contact point. The type selection may be included within the contact request. The user contact preferences may be indicative of a user's preferences associated with the type selection. The software executing on the system computer for comparing a contact request with the user data may generate a list of available contact points. The system may also include software executing on the system computer for receiving a selection, the selection indicative of one of the available contact points. The system may also include software executing on the system computer for determining if a communication between two users was successful.

The system may further include software executing on the system computer for receiving user contact data which is indicative of user contact preferences for at least one contact point associated with one of the users; and the software for comparing the contact request with the user data may further be for comparing the contact request to the user contact preferences to determine which of the plurality of contact points can be used to contact the user at the select time. The user contact preferences may be updated based on whether or not the communication is successful.

The system may also include software executing on the system computer for receiving user contact data which is indicative of user contact preferences for at least one contact point associated with one of the users. The system may include software executing on the system computer for generating a pattern from the user data and the contact data. The system may also include software executing on the system computer for generating at least one rule based on the pattern, the rule transmitted to the user. The system may also include software executing on the system computer for receiving a selection in response to the rule, the selection indicative of if the user elects to accept, decline or postpone the at least one rule for updating the preferences.

The software for updating the user preferences may transmit an update request to a user, the update request indicative of a suggested update to the user preferences. The system may further include software executing on the system computer for receiving a response to the update request.

The system may further include software executing on a processor of a client computer for providing an interface, the interface for generating the contact request. A portion of the user data may be received from a storage in communication with the system computer.

The system may further include software executing on a processor of a user computer for providing an interface, the interface for generating at least one user contact preferences for transmission to the system computer.

In other aspects, a system is provided for securely routing a communication from a first user to a group of users having one or more users therein. The system may include a system computer having a network connection. An interface module may be associated with the system computer and allowing the first user to access said system computer with a user computer. A contact module may be associated with the system computer. The contact module may receive a contact request and at least a first communication. The contact module may also receive a security parameter from the user computer. An activity module may be associated with the system computer and may receive user data indicative of the activity status for each of at least one contact point. Each contact point may be associated with a user in the group. A comparison module may be associated with the system computer and may compare the contact request and activity status of each of the at least one contact point to transmit the first communication to each contact point having an activity status indicating that the user associated with the contact point is actively using the contact point. A security module may be associated with the system computer and may determine the security parameter associated with the communication, and security module may restrict the first communication according to the security parameter.

The security parameter may be indicative of a time period. The system may further include a status module associated with the system computer. The status module may determine a start time indicative of when the second user has received the first communication. The security module may restrict the first communication by erasing the first communication based on a comparison between the start time and the time period.

The time period may be automatically determined based on a length of the first communication. The security parameter may be indicative of a maximum number of users that are allowed to receive the first communication. The security module may automatically determine the time period based on a length of the first communication. The security module may prevent a user who receives the first communication from re-transmitting at least a part of the first communication. The security module may prevent content of the first communication from being transmitted to a third party user, when the third party user is a user other than the first user or a user in the group.

In other aspects a computer implemented method is provided for routing communications. The method may include one or more of the following steps: executing software on a system computer; receiving a contact request via the software, the contact request indicative of at least one contact points associated with a user; receiving contact data associated with a plurality of contact points; receiving activity data via the software, the activity data indicative of contact points that can be used to contact the user at a particular time; comparing a contact request with the user data via the software to determine which of the plurality of contact points for the user can be used to contact the user at a select time.

The method may also include generating a notification via the software for transmission to a user where the notification is indicative of at least one contact point. Further the method may include receiving a selection via a user interface provided by software executing on a processor of a user device. The selection may be response to the notification and indicative of one of the at least one contact points. The response may include a selection of at least one contact point. The method may also include generating a rule via the software based on the selection. The software may transmit a preferences request to the user, based on the rule. The method may further include receiving a response to the preferences request via the software. The method can also include updating the user contact data based on the response to the preferences request.

In addition, the method may include generating a notification via the software for transmission to a client, the notification indicative of the availability of the user. The method may also include receiving a response via the software the response including a selection of at least one contact type. The method can also include comparing the user data, client activity data and the response to determine when two users are available using the contact type selected with the response. The contact type may be selected from the group consisting of: voice, video, instant message, social media, e-mail, MMS, and text.

The method may also include providing an interface, the interface including a type selection module for selecting at least one type of contact point to use to contact the user. The method may also include receiving user input via the interface, the input indicative of at least one contact point. The method can also include generating the contact request via the interface.

The method may also include providing a method by which information can be transmitted in a secure fashion, for example file attachments and sensitive data that should be confidential and not forwarded. This method may include a variety of techniques including restricting viewing of an attachments or mail body to a limited audience, a limited amount of time, or providing password protection and encryption for the message.

In some cases, restriction can prevent a user from saving, printing, re-transmitting, screen capturing or otherwise preserving, disseminating or forwarding information deemed sensitive. The restriction can be individual based. For example, employees who initially receive the restricted communication may be allowed to communicate amongst the group of employees receiving the first communication. The individual initiating the communication may have permission to add new individuals to the group of individuals with permission to re-transmit, or save. The permissions may be set on a group, employment position, individual basis or other. The system may be set to restrict communications initially marked as sensitive from dissemination outside the company. It is understood, however, that individuals acting as agents or having a confidential or privileged relationship with the company may be allowed to receive sensitive communications without restriction. For example, attorneys representing the company would be given permission to receive re-transmitted or forwarded messages. The individuals having the confidential or privileged relationship can be identified as having such permissions within the record associated with that individual, firm or company.

In other aspects, the system may use a response velocity measurements or rating to determine the preferred contact point or contact point with the best chance for communicating. The response velocity is disclosed in U.S. patent application Ser. No. 14/172,509, the content of which is incorporated by reference herein. Therefore, when a user is more likely to respond quickly using a particular contact point, the system may weigh the response velocity as a factor when determining which contact point to select or suggest for communication. It is understood that there are a number of factors such as preferences, activity and historical usage which can impact the contact point(s) that have the best chance for communication. These factors weighed by the system to aid in routing communications.

Other objects of the invention and its particular features and advantages will become more apparent from consideration of the following drawings and accompanying detailed description.

DETAILED DESCRIPTION OF THE INVENTION

Figure 1:
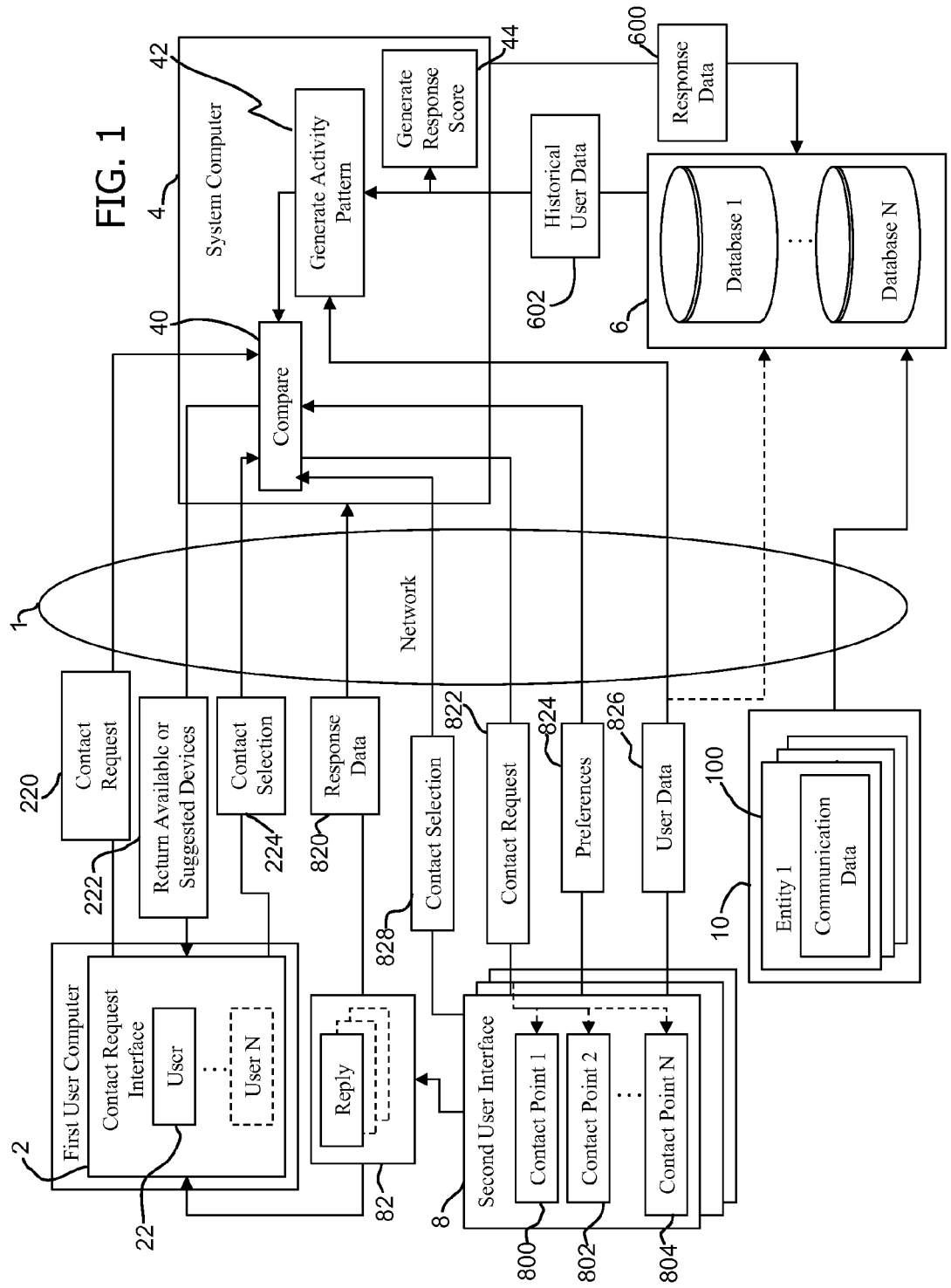
FIG. 1 is a block diagram of aspects of the present invention.

Referring now to the drawings, wherein like reference numerals designate corresponding structure throughout the views. The examples provided herein are presented to further illustrate and explain the present invention and should not be taken as limiting in any regard. In FIG. 1, a system computer 4 having a processor with software executing thereon is in communication over a network 1 with a contact request interface 2 and a user interface 8. The contact request interface 2 and user interface 8 are both provided by software executing on a processor. The interfaces 2 and 8 can be provided on a number of different devices, for example a mobile device, desktop computer, laptop computer and the like. The contact request interface 2 may reside on a client computer, which allows a client to select from one or more users 22 that the client wishes to contact. The interface 8 may exist on a user device such as a user computer, mobile device and the like. Although the term client has been used herein, an individual who is a client can also be considered a user as the client uses the system in order to contact users. The term client has been used to differentiate between individuals. For example, the client can be considered a first user, and the second user can be considered a user that the first user would like to contact. A contact request 220 is generated by the software executing on the processor of the client computer using the contact request interface 2 selection(s).

Data 10 received by the database includes communication data 100 relating to one or more entities. The communication data 100 may include activity data, contact data and other information that may pertain to the communication patterns, history and/or usage of individuals associated with the entity. Such individuals may be considered clients or users as described herein. Although the term client is used, it is not intended to designate a particular relationship, and is used to distinguish between computers or individuals interacting with the system. As one example, typically as shown in the figures and described herein, the client may be the individual who initiates the contact request to contact a user, and the client computer may be the computer that the client uses to initiate the contact request.

The system computer 4 and/or the database 6 receive activity data 826. The activity data can show which contact point(s) are active. Activity data 826 and historical activity data 602 may be used by the system computer 4 to generate a pattern 42. There are a number of possible scenarios for generating a pattern 42, and this pattern can be based on current activity and/or historical activity. The pattern 42 is compared 40 with the contact request 220, and user preferences 824 to return available or suggested devices 222 to the contact request interface 2. The activity data can also include data pertaining to the calendar(s) of various users and/or clients, and the data pertaining to the calendar(s) can be used to determine if the user is in a meeting. For example, if a user typically responds to text messages while in a meeting, a text message may be one of the suggested contact points returned 222, alternately, text message may be automatically selected where appropriate.

User data may include but is not limited to information pertaining to a user's appointments, schedule, activities, location and contact point usage. User data may be generated based on a user's speed in responding to communications received at certain contact points. This user data may also be generated based on lack of responsiveness from certain contact points. User data can include data that indicates an activity status of one or more contact points to determine which contact points a particular user or group of users can be reached at. In some cases, a user may be in the office building, but may step away from their desk. In this case, the user data would indicate this change in activity status for the desk phone. If the user has their mobile phone with them, the system can automatically route all calls sent to a desk phone directly to a mobile phone. In other aspects, if the mobile phone has no service or typically has poor call quality at particular locations, calls to a user's mobile phone can be re-routed or automatically forwarded to another phone number, for example, a home phone. The speed or response velocity of a user's communications in general or as associated with one or more contact points may be used to determine the contact point with the best chance for communicating with a particular user. The speed or response velocity associated with one or more contact points may also be used to set or determine preferences.

The user data may include information pertaining to a user's communications activity and/or schedule. For example, user data can include information about travel schedules or reservations. In this case, if a user reserves a flight and receives an e-mail from the airline confirming the flight, the user data will include information on the flight, because while the user is in the air, only certain points of contact would be desirable to use. If the flight has an internet connection, e-mail may be the best point of contact. In the example of a flight, the availability of an internet connection may be taken from a third party data source, such as a flight status website. Also, the system can compare the user's location to the location of the departure airport and the destination to determine the times the user is likely to be driving to the airport, and thus likely to be available by mobile phone. Voice recognition and email or text recognition can be used for generating user data. Optionally, a user's calendar can be updated with the user data to show appointments. This eliminates the step of a user adding their appointments made over the phone to their calendar manually. Optionally, once the user finishes a phone call, the system can put together a draft appointment based on the conversation for confirmation, modification or cancellation by the user. The draft appointment can be shown in a notification for the user.

User data may include data on user location, appointments and travel schedule. If a user's mobile phone is located outside their office, it is unlikely that the office line would be a good place to reach the user. Restaurant reservations are also often being made online, and similar to flight reservations, the system could track e-mail confirmations to determine if a user is out at a restaurant and therefore unavailable. To the same end, if a user calls a restaurant to make a reservation, the system can be configured to use voice recognition to determine what time and date the reservation is scheduled for, and then the user data 826 would include a dinner reservation that would be used when generating a pattern 42.

User data can also include information regarding where a user is within an office building. As an example, most individuals have computers at their desks. Many computers will show a lock screen after a certain amount of inactivity time, thus if a computer does not show a lock screen it may be more likely that the individual associated with the computer is sitting at their desk. Also, lighting systems of some offices can have motion sensors that will automatically turn off when nobody is sitting in the room. Therefore, user data can include information about the computer, light sensor or other sensor in a user's office. The system can then determine if the user is likely to be available at their desk phone or not. The examples provided herein concerning user data are illustrative only and not limiting.

Other types of sensors can be used to monitor the location of an individual. Some computers include cameras facing the user, and office buildings may include security cameras. The system can use face recognition software to track an individual's movement in the office to determine which contact points are likely to be available. In addition, proximity sensors or radio frequency identification (RFID) sensors may be connected to the system to determine the location of individuals. In some cases, individuals may have key cards that allow for access to certain buildings or parts of the building. These sensors may include RFID tags that are read by RFID sensors to determine the location of an individual when GPS may be less accurate (inside a building). Therefore, if an individual's office is on the first floor and a proximity or RFID sensor on the second floor shows that the individual is on the second floor, calls may be routed to the individual's cell phone. However, if the individual is in a conference room, it may be expected that a meeting is taking place and a text message or e-mail is more appropriate. In order to determine if a meeting is taking place, the system can compare to individual or company calendars and room schedules to determine if a user is in a meeting in the particular conference room where the proximity or RFID sensor indicates that the user is in the conference room. Proximity sensors can include Infra-red, motion, camera, pressure or other sensors that be used to determine the location of a user.

User data 826 is received for each of the users for generating the pattern 42. For example, if User 1 is in a meeting with the CEO (User 2), User 1 may not wish to ever be bothered, and all contact requests would be routed accordingly. May be the meeting between User 1 and the CEO is taking place in User 1's office, therefore the system would know based on the user data of User 1 and the CEO that the office phone of User 1 should be directed straight to voicemail. Alternately, when a client requests to contact the User 1 through the contact request interface 2, the office phone is not returned 222 as available.

Contact data may include but is not limited to information pertaining to a user's preferences for contact points used, rules and permissions pertaining to users or groups of users. As an example, contact data may be generated based on a user's patterns of responsiveness or an action such as ignoring or refusing a communication. Contact data may also be updated, created or modified by a user. A user may wish to have a particular order of contact points that are associated with a user's contact preferences. A user may also wish to have a priority list of individuals that will be allowed to contact the user regardless of the activity status or preferences set. For example, a user may wish that communications from family members are routed regardless of a user's preferences. Other contact data may indicate certain times that contact points are restricted. For example, a call at 2:00 am may be routed automatically to voice mail based on the time of day and the location of a user or a mobile device. In some cases, a message may be returned to the first user indicating that they are outside the normal timeframe of communications. It may be possible for the first user to respond that the communication is urgent or an emergency or it may be possible to mark the contact request as urgent or an emergency.

User data may also include an indication of an alarm time. Many individuals use mobile phones for morning alarm clocks. User data may also be used to determine when a user is sleeping. Based on the comparison of user data and contact data, audio, visual or sensory alerts may be automatically suppressed, depending on the time of day. Further, when a user is in a meeting or in the office, it may be desirable to silence all alerts on the phone and automatically switch to "vibrate" mode. The system could determine based on user data when a user is in a place where a mobile phone should be silenced, and then phone calls could be re-routed to other contact points, or the audio alert could be silenced. When a user is sleeping, it may be desirable for the vibrate function to be suppressed as well. Contact data may override the silencing or vibration suppression, depending on those preferences set by the user. For example, the audio, visual or sensory features of a contact point may be activated at any time when certain family members attempt to contact a user. Also, the contact request can indicate that the communication is urgent or an emergency, thus allowing the audio, visual and/or sensory alert.

User preferences 824 can be set to route contact requests to specific devices or contact points based on a number user identified rules or rules that are identified based on historical user data 602 or the generated pattern 42. A user may wish not to be contacted on specific devices at specific times, locations or other. For example, when in a meeting, the user may not want their mobile device to ring, and therefore preferences may be set to direct contacts to e-mail, text or voicemail without having the mobile device ring. At the same time, there may be scenarios where a user would wish to be contacted no matter what they are doing. For example, if a user is being contacted by their child's school, this may be a scenario where the user would always want to be alerted. Optionally, the preferences may be set to produce an audible ring on a mobile device even if the user has silenced their mobile device.

As another example, when in the office, one user may prefer that calls are routed to their desk phone instead of a mobile phone. In some cases, the system would automatically route calls to the user's desk phone based on these preferences, in other cases, the system would simply suggest that the desk line be used, or the system would indicate that the desk phone is the most likely available. In some cases, contact data or preferences could indicate that the user would like all calls routed to their office phone number while they are at work. At the same time, it is possible that user data can indicate that the user is not sitting at their desk, but is at the office based on the location of a mobile phone or other data point associated with the user. In this case, the system may still show the desk phone as the most likely contact point, however, because the user is not at their desk, the system may automatically route a contact request contact to the user's mobile device without indicating to the requester that the mobile device is being dialed.

In some cases, voice mail greetings are different for each contact point. The system can route all voice messages to a single inbox or location where all voice messages can be retrieved. In the example where the first user initiating the contact requests attempts to contact the second user via mobile phone, the voice message greeting played could be associated with the mobile phone, even if the system has automatically forwarded the communication to a different contact point, such as an office phone. It is also possible that one greeting is used for multiple or all contact points.

As used herein, the term "communication data" may include but is not limited to contact data, user data, preferences, information pertaining to contact points associated with particular users, historical contact point usage based on individual workload, job title or other. This communication data may be received from individual devices or computers connected to the system. The communication data may also be received from a server or database associated with a company. The communication data received from a company may be related to the individuals working for the company where the individuals have a number of contact points connected to the system.

Preferences can also be set based on other criteria such as location. For example, if the user's location is at a court house or other location where the use of mobile phones may be prohibited, preferences can be set to route communications away from a mobile phone. At the same time, it may be desired for certain people to be let through to the mobile phone, and preferences and alerts can be set accordingly. The setting of preferences can also evolve based on activity. For example, the system may determine preferences based on refused contact requests or how specific contact requests are routed by the user.

Preferences can also be set based on other criteria such as time of day or the date. For example, after office hours when the user is at home, preferences may reflect the use of accounts available on the user's home computer. Further, the routing and prioritization of calls may change where social callers may now be allowed to contact the caller that was previously blocked during office hours. Further, availability times on the weekends may be reduced or changed from the weekly schedule Once the user interface displays available or suggested devices 222 on the contact request interface 2, the client can select from the available or suggested devices to generate a contact selection 224. The contact selection can be routed directly to the selected contact 800, 802, or 804. Alternately, the contact request can be routed through the system computer 4 and then routed to the selected contact 800, 802, 804.

Alternately, when the user interface 8 receives a contact request that was generated by the software of the contact request interface 2, the user can select 828 the contact 800, 802, 804 that the user would like to initiate contact with.

The system may also be configured so that the contact request 220 is generated on the basis of the returned available or suggested devices 222. Therefore, the user receives the contact request and selects a contact 800, 802 or 804 to use for the communication. If the user does not answer or otherwise ignores or designates their status as busy, the system would then either route the contact request 220 to a specific contact 800, 802, 804, or the system can updated the devices returned as available 222. Once the user 22 receives an update to the return of available or suggested devices 222, the software of the contact request interface can generate a contact selection 224 that is sent to the contact 800, 802 or 804.

It is also contemplated that a contact request may be initiated by a contact point that is not using the contact request interface (outside contact request). For example, a phone call from an individual's child may come from the child's mobile phone. If the individual is not available on the phone number called, the system may automatically generate a voice message suggesting alternate contact points. When the system suggests alternate contact points, the automatic voice message (or automatic e-mail) may be set to generate only when the contact request (e.g., phone call) is received from a known number that is in the individual's contacts. Caller id may also be used to associate the automatic emails or voice messages with a known number (or contact point). For example, if Caller ID shows the school that the child attends, the automatic e-mail or voice message may be generated. In some cases, the system may return a prompt to the outside contact request that allows for a scheduling or request for a call back. The system can also allow for various urgency indications. The system could be set to automatically attempt a call back once the availability of one or more contact points becomes active.

As previously discussed, the contact may be routed to a specific contact if the user fails to answer or ignores a contact request. In this case, the communication may be sent to a contact such as e-mail, text or other contact for later reading. The ignoring of a contact may be considered part of the user data 826 and this user data 826, along with historical user data 602 can eventually become part of the generated pattern 42. The pattern can eventually become a preference 824. Optionally, the system can be configured to notify the user of how the system is updating their preferences on the basis of activity 826 and historical user data 602. The user may then accept, modify or decline the preference rules that are generated as the system accumulates more information on the user's contact patterns, activity and preferences.

If the user data 826 shows a pattern that may need to become a preference 824 associated with a user, the system can be configured to learn these preferences as a user's activity evolves. The system may also be configured to alert the user of a change to their contact preferences, and the user may accept, modify or decline any suggested changes to preferences. In the event the user declines the preferences, the system still has access to historical user data for use in suggesting devices or contacts to be used, however preferences would be considered rules that may prevent contact through certain devices based on rules such as who is attempting to contact the user, or what time the contact is initiated. The system may also include an emergency contact that alerts the user of a possible emergency, and the emergency contact is routed with a higher level of priority, and may ignore a user preference in an attempt to reach the user.

Once the user receives the contact, there may be a need to reply to the communication. For example, if the original client attempted to contact the user to talk on the phone, but was required to leave a message or e-mail requesting a call back, the system would view the call back request as a preference for the particular reply and would first attempt to route the reply accordingly. The system may also recognize that the client is attempting to schedule a call with the user and would therefore leave a message with the user and notify both parties when there is availability for both to speak on the phone. Also, the system could be configured to automatically connect the two individuals (client and user) based on real time monitoring of user data.

In the above example of an automatic connection, if the CFO wanted to speak with the CEO for 5 minutes about an important issue, both individuals may have busy schedules that often do not line up. If the CFO puts in a contact request for a call to the CEO and the CEO is not immediately available, the system may be configured to notify the CEO of the desire to connect with the CFO and the system would then monitor both parties' real time activity to determine when both are available. The system could then notify the CFO in real time when the CEO is available, and the system could automatically connect both parties on the basis of the original phone contact request. Alternatively, one or both parties can be notified of the availability of the other, and this may depend on preferences.

When there is a reply 82 to a communication, response data 820 can be sent to the system computer for use in a number of ways. The response data can be used in generation of the pattern 42 in order to more efficiently route communications based on how the user is most likely to reply quickly. The response data 820 can also be used to generate a response score 44 in response to a request for a response score 810. A response score can track the individual's communications effectiveness. The system computer 4 may use response data 820, historical activity 602 data and/or user data 826 to generate a response score 44. The response score 830 can be based on the average reply time, volume of communications, availability patterns and other characteristics that would influence how effectively an individual communicates. This score can be determined on the basis of a threshold, standard or norm, which may be pre-set within the system or may be selectable or modifiable. The threshold, standard or norm, and can also be determined on the basis of a comparison to other individuals in the company or alternatively other individuals in similar fields outside the company. As an example, certain positions in a company may require levels of responsiveness in order to meet company goals. Therefore, the response score could be based on a required threshold, standard or norm for the position. In addition, exceptional response score in a particular position may indicate that an individual would qualify for a different position within the company, and therefore the response score may indicate how an individual compares across other positions in the company.

In order to generate a response score 44 that includes a comparison against individuals outside the user's company, the database receives communication data 100 from a number of entities. In generating a response score 44, the historical user data 602 may include relevant communication data 100 of outside entities. As an example, a salesman may wish to compare his communications effectiveness with a group of salesmen within the industry. In this case, the salesman could request a response score 810 on the basis of the desired criteria or metrics for comparison in order to have the system computer 4 request or use the appropriate data for generating the response score 44. The response score 830 is then returned to the user interface. In the example of a salesman, the response score may be based on the amount of time it takes for a salesman to generate a sale from a sales lead and how many communications are used to do this. The score can also compare how long it takes for the salesman to confirm the interest of the particular sales lead. That is, some sales leads may not have any serious interest in making a purchase, and the salesperson may be considered more effective if they are faster to eliminate the false sales leads. The response score may also be a comparison to how often the salesman follows up with potential customers and how long it takes to close a sales lead. The discussion of a salesman is provided as an example only and is not limiting.

The system can also track communications based on a particular subject. For example, if a budget is being circulated and the budget relates to different departments, each department may work on a different portion of the budget. The communications on the subject can all be tracked and compiled in a manner that allows for easy access to the communications so that an individual can determine what has been done on a project at various stages. This allows for enhanced collaborative efforts that streamline communications on a particular subject.

Figure 2:
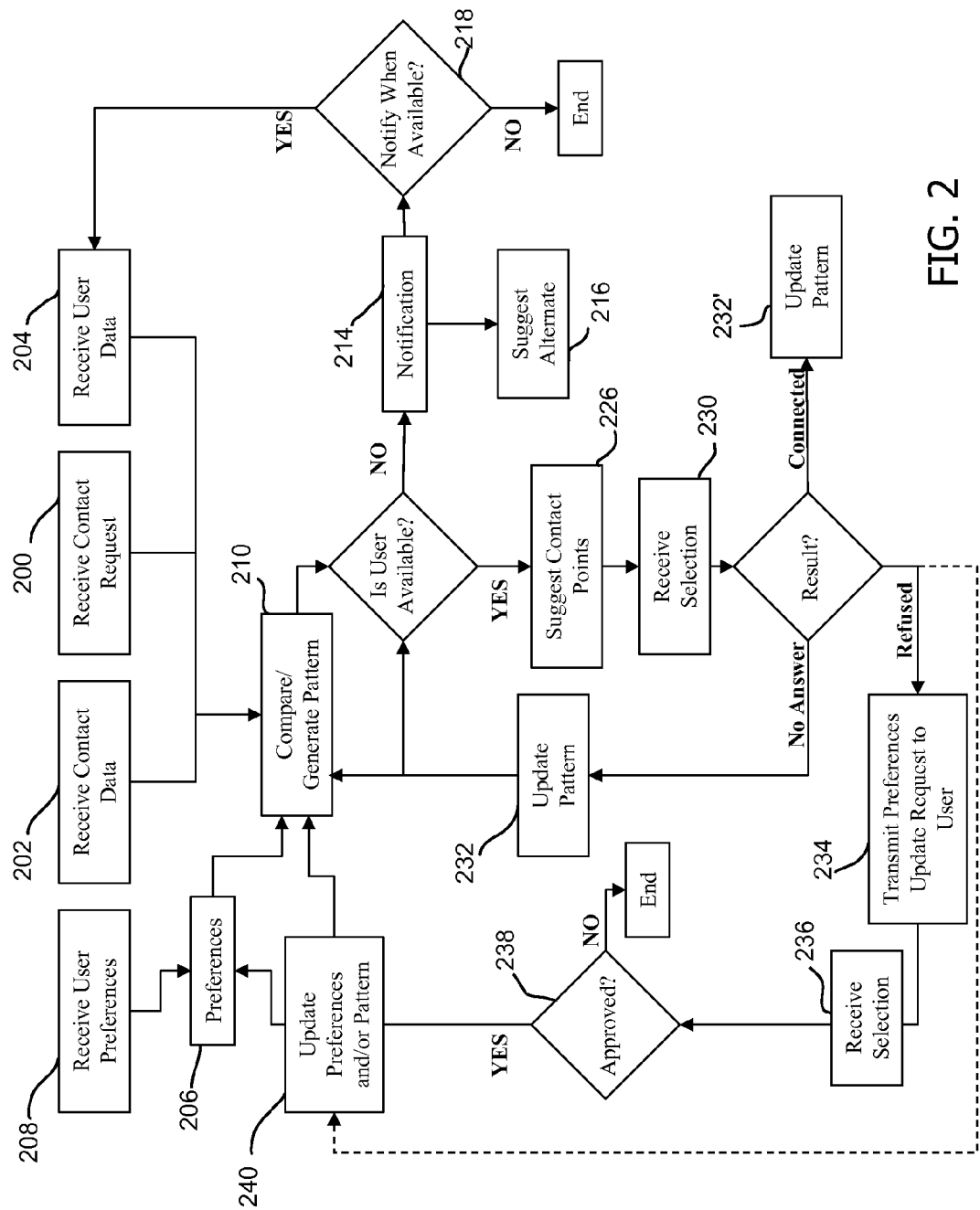
FIG. 2 is a flow diagram of an aspect of the system shown in FIG. 1.

In FIG. 2, the system receives a contact request 200, contact data 202 and user data 204. The contact request may come from a client device such as a client computer which may be associated with one or more contact points. The contact data may include information pertaining to preferences 206. The preferences 206 may be received 208 from user input. The preferences may also be generated based on the previous communication patterns or usage. A pattern is generated 210 to determine if the user is available 212. If the user is not available a notification 214 may be generated and sent to the client, for example via a client computer. In response to this notification, an alternate contact point 216 may be suggested. For example, if the client requested a telephone call with the contact request, the user(s) may not be available and a text message may be more appropriate. The system may suggest an alternate contact point. The system may also prompt the system to notify the client when the user is available using the contact point or contact type requested in the contact request. The contact type can refer to a grouping of contact points for example voice call. The contact points in the case of a voice call may be the particular phone numbers, extensions or user identifiers that can be used for a client to connect to a user.

If the user requests to be notified, the system can monitor the user data, and based on the pattern 210 and/or the user data 204, contact points can be suggested 226. Alternately, the system may automatically connect the client and the user, using a preferred or probable contact point. When contact points are suggested, client input may be received 230 to select a contact point. The result of the connection is monitored. If there is no answer in the case of a phone, the pattern may be updated. Although the figure shows "no answer" the system can also update the pattern 232 in the case of a delayed or slow answer as appropriate, depending on the type of contact point. If a connection is successful, the pattern is also updated 232' based on a successful connection.

In some cases, the contact will be ignored or refused by the user. Based on the refusal, the system may determine if preferences should be updated based on prior refusals and/or the previously generated pattern. In some cases, the preferences change will need to be verified by the user, therefore a preferences update request 234 is transmitted to the user and a selection 236 is received. If approved, the preferences and/or pattern are updated 240. Where a connection or communication is not successful, the system could revert to the next most probable contact point. In this case, the probability that the first selected contact point is available would be now known to be 0% because the communication was recently unsuccessful. Therefore, the contact point that previously had the second best chance of availability now has the best chance of availability.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 3:
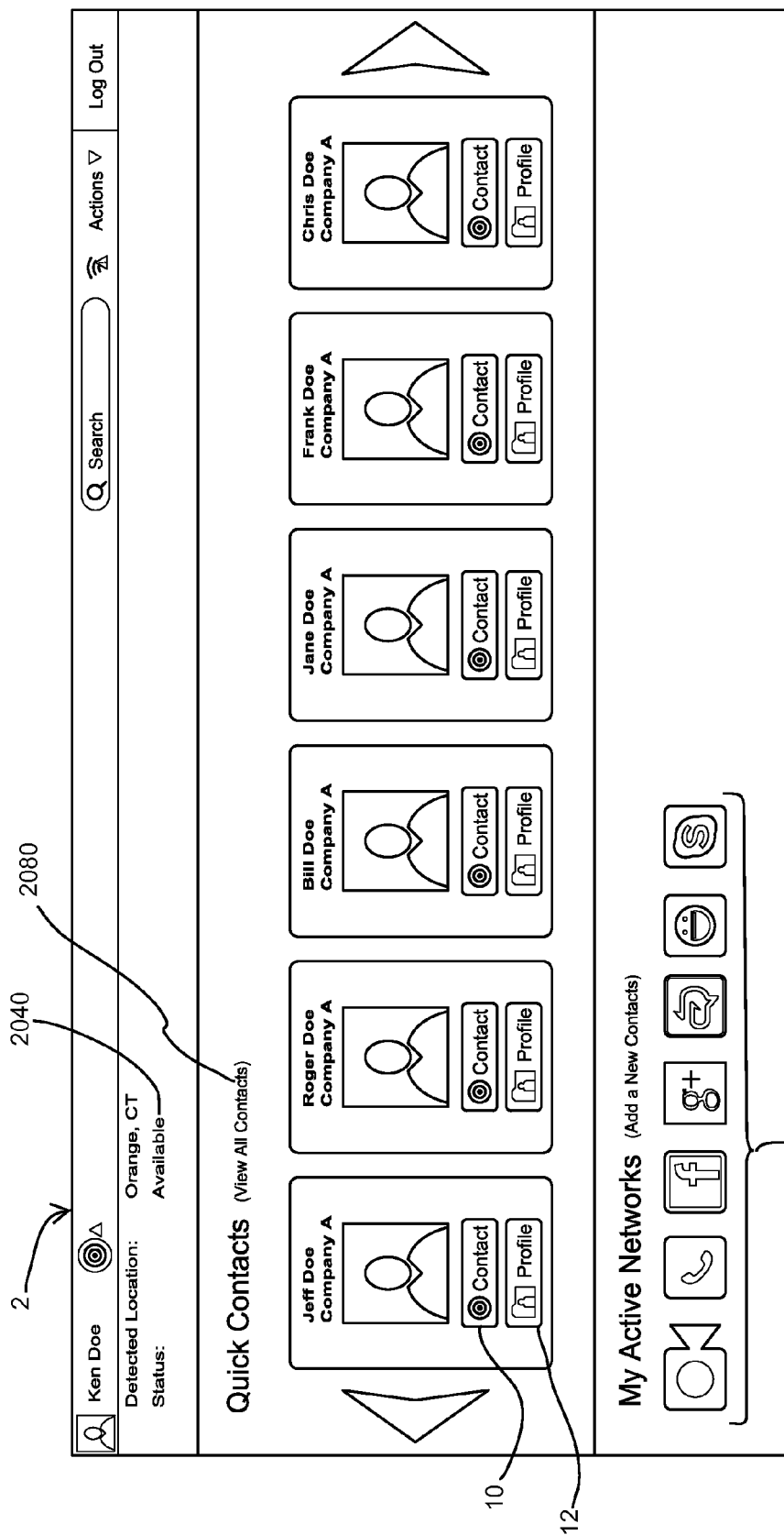
FIGS. 3, 4A, 4B and 5 illustrate aspects of interfaces in FIG. 1.

In FIG. 3, the system computer receives the contact request 400, contact data 402 and user data 404. The contact request may be initiated by a first user who wants to contact a second user. The contact request may indicate a particular type of contact point, for example, phone, instant messaging, social media and others. A pattern is generated 42, for example, by comparing the contact request, contact data and user data. The contact data can include a user's preferences 824, which can be received 418 by the system. Based on the comparison and/or the pattern, the system computer determines if the second user is available. If the user is not available, a notification may be sent to the first user 422 and alternate contact point or contact type may be suggested. The system may also receive a selection that indicates that the first user would like to be notified when the second user is available. If the first user would like to be notified when the second user is available, the system computer can monitor the activity of the second user and likewise update the user data 404 to update the availability of the second user. If the second user is available, the contact points may be suggested 406, for example, if the contact type of the contact request is phone/voice, the system computer may suggest a mobile phone line, office line, home phone line or other. Based on the selected 408 contact point, a connection is attempted. If connected, the pattern is updated 410 along with the user data 404. If there is no answer, the system computer updates the pattern 432 and then, assuming other contact points are available, contact points are suggested 406 again based on the pattern. It is also possible that a comparison and update of the pattern will not be necessary for completing the pending contact request because of a small amount of time that has elapsed since there was no answer. Therefore, if there is no answer, it is also possible for the previously suggested contact points to be suggested again. If suggested again, the contact point first attempted would be removed from the suggested contact points. The suggested contact points may also be ranked in terms of likelihood of a successful connection. The ranking may simply be a rank order with the most probable being shown first. It is also possible to show a likelihood indicator in the user interface that indicates visually or audibly how probable a connection is. For example, color shading or percentage rankings could be used.

As a further example, if the first user attempts to connect via the second user's mobile number and there is no answer, the second user's office line may be available. Since there was no answer at the mobile number, the pattern would be updated. Although not shown, it would be understood that the user data stored in the data base could also be updated based on there being no answer at the mobile number. The process is repeated and one of the suggested contact points may be selected 408 and a connection is attempted. In some cases, the contact may be refused by the second user. In this instance, a preferences update request 412 may be transmitted to the user. For example, if the second user ignores a call on their mobile phone, the preferences update request may be sent directly to the mobile phone, or the preferences update request may be stored in a database for later use and response. The preferences update request may have a standard set of replies or user contact preferences that can be easily selected 414. For example, upon pressing an ignore button on a mobile phone, a reason for the refusal or ignoring of a call may help the system better route communications in the future. For example, a standard reply could be a touch screen button that that indicates the second user is in a meeting, at a restaurant, wishes to block the first user or other. The response would be received, and the user data and/or contact data would be updated with the activity status and/or preferences associated with the reply could be entered.

It is possible to set a status indicator 2040 that would be considered a preference. For example, a "busy" status may route communications to email for later reading. The status indicator 2040 can be set by choice or can be determined by the software based on user data. A list of contacts is shown, and optionally the client can select to view all contacts 2080. A number of contacts are shown, and the client can select the contact button 10 to initiate a contact request 2200. The user profile can also be viewed using the profile button 12. The client's active networks 2020 are shown by the icons that each represent a contact point. The icons may represent social networking sites, video conference, chat sites, mobile phones, phone lines and other contact points that may be added. A client can add a new contact point 2060 by selecting the appropriate link.

Figure 4:
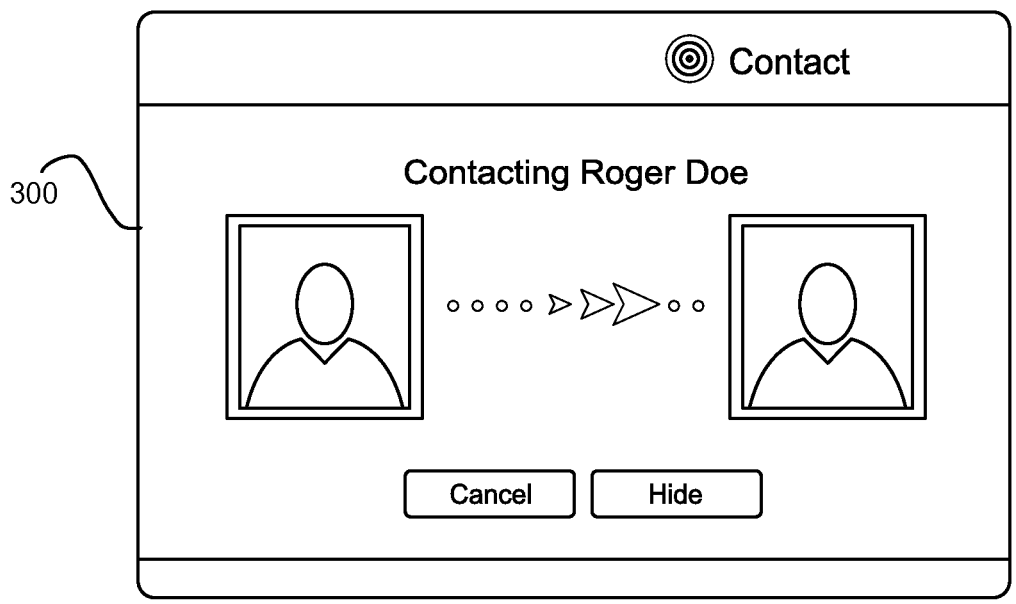
Figure 4:
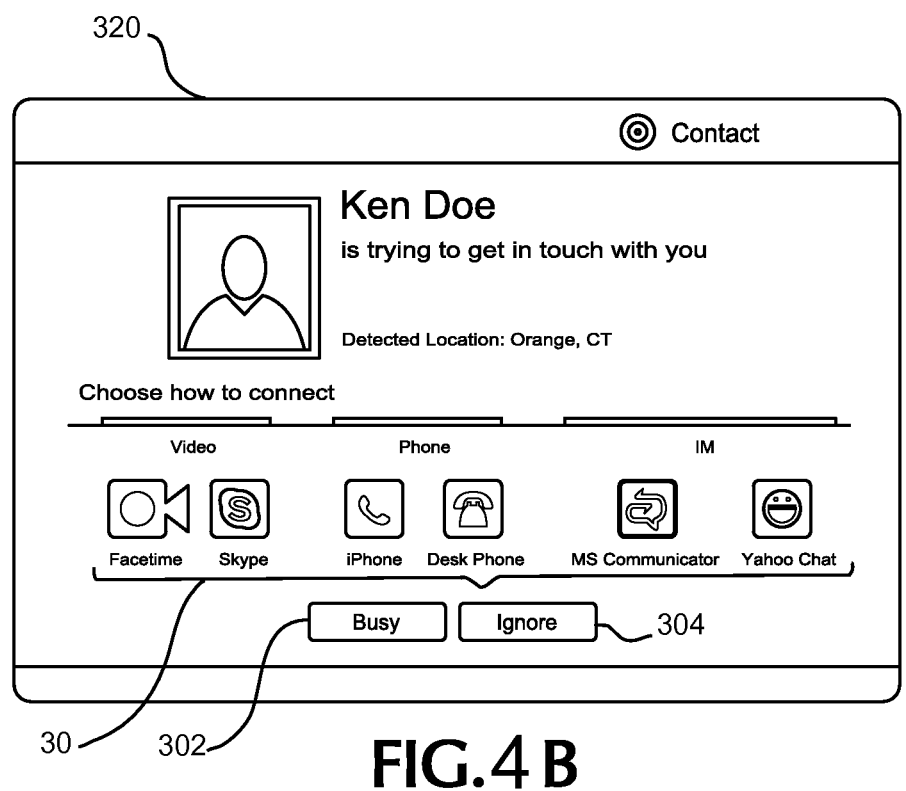

FIG. 4A shows an example of what happens once the contact button 10 is selected and the system attempts to contact a selected user. FIG. 4B shows the interface 320 seen by the user receiving the contact request. The user can choose how to connect from a number of icons 30. The icons can represent the mutually active contact points. The mutually active contact points may be displayed in a way that visually distinguishes them from the non-active points. For example, the non-active points are shaded or partially transparent. Further, the non-active points may not selectable by the user. The user can alternately select a non-active point if desired and the availability changes. For example, if the user sits down at their desk and wishes to take the call on their desk phone, which was initially not active, the user can selectively route the call to the desk phone. The interface 320 also includes buttons that allow the user to designate their status as busy 302, and a button that allows the user to ignore 304 a contact request. The system of FIG. 1 and the interfaces shown in FIGS. 3, 4A and 4B can also be configured to connect more than two people based on availability, preferences and activity.

Figure 5:
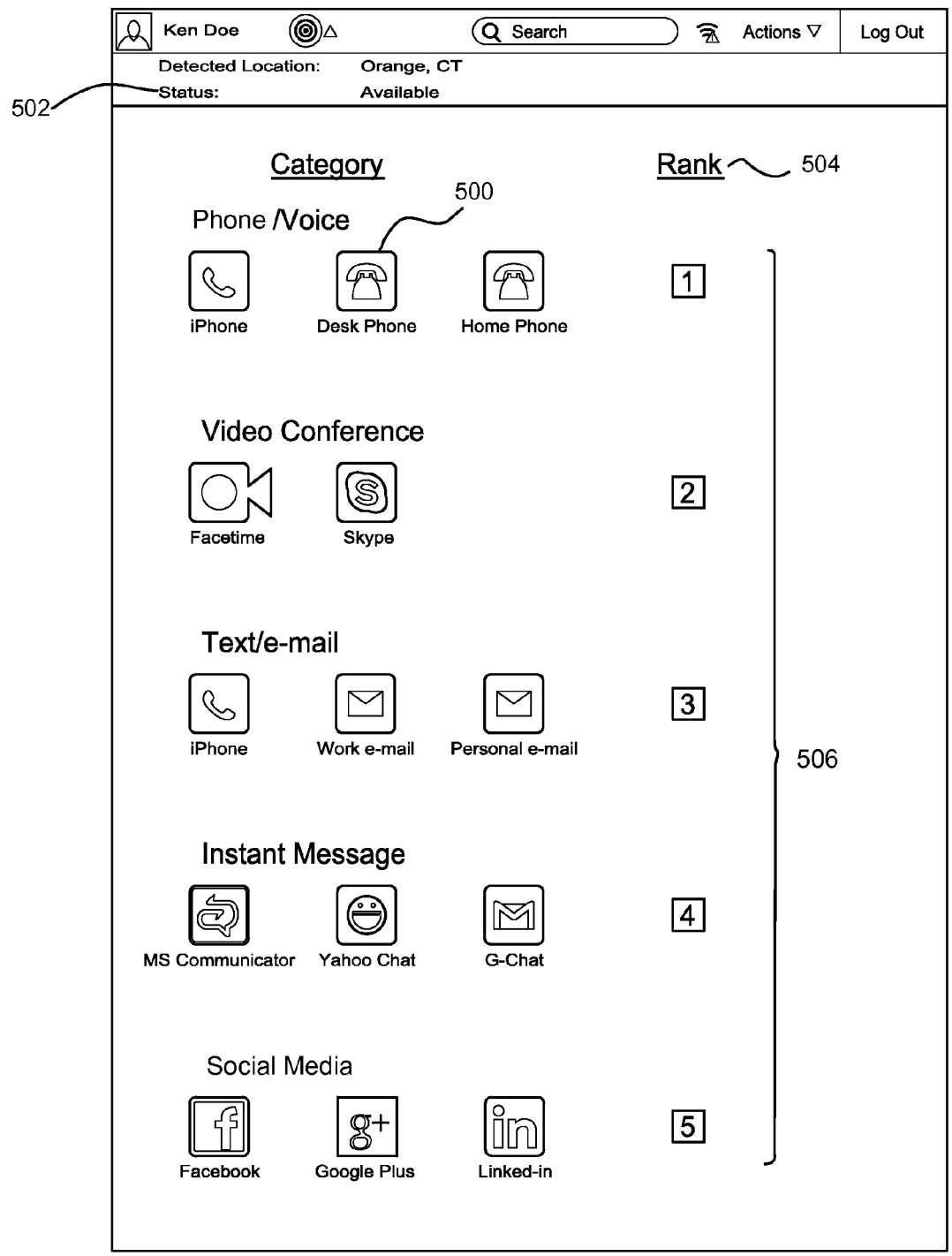

In FIG. 5, an exemplary interface that allows a user or client to select preferences is shown. The various contact points may each have an icon associated therewith for easy visual identification. For example, icon 500 indicates a desk phone. The contact points may be separated by category. For example, phone/voice, video conference, text/email, instant messaging and social media may be categories. However, it is understood that there may be overlap between various contact points between categories. For example, some social media platforms allow for instant messaging capabilities.

The rank column 504 allows an individual to set contact preferences for how they prefer to be contacted by designating a numerical rank 506 to different categories or contact points. The interface may be generally for all individuals, or the interface may relate to specific individuals or groups of individuals. Further, individual preferences may be set for each contact point. For example, the interface may allow the individual to click on the desk phone icon 500 to go to a new page or window in the interface. This new window may allow the user to input time preferences associated with the specific phone. Further, the system may allow the user to have certain contact points forwarded to other contact points automatically based on time, date or other selection or data. For example, an individual may wish that the desk phone is forwarded to their mobile device based on the location of the mobile device or the location of the individual. Often, cell or mobile phones have GPS devices that can transmit locations to the system computer or other database. Therefore, the location of the mobile phone may be associated with the user. Other useful information can also be gleaned from many devices such as Wi-Fi network SSID, IP address, Cellular network or even tower connection to determine location information. If the user's location is different from the office location, the system may be set up to automatically forward calls received by the office line to the individual's mobile phone. In some cases, the status 502 may indicate certain preferences to the system. For example, a "vacation" status may disable forwarding of calls from the office to the mobile phone based on location. Further, the status can be automatically set based on calendar events. For example, a status of "in meeting" could forward all calls to voice mail. If the status indicates the individual is in a meeting, a custom voice mail greeting could be associated with the status.

Figure 6:
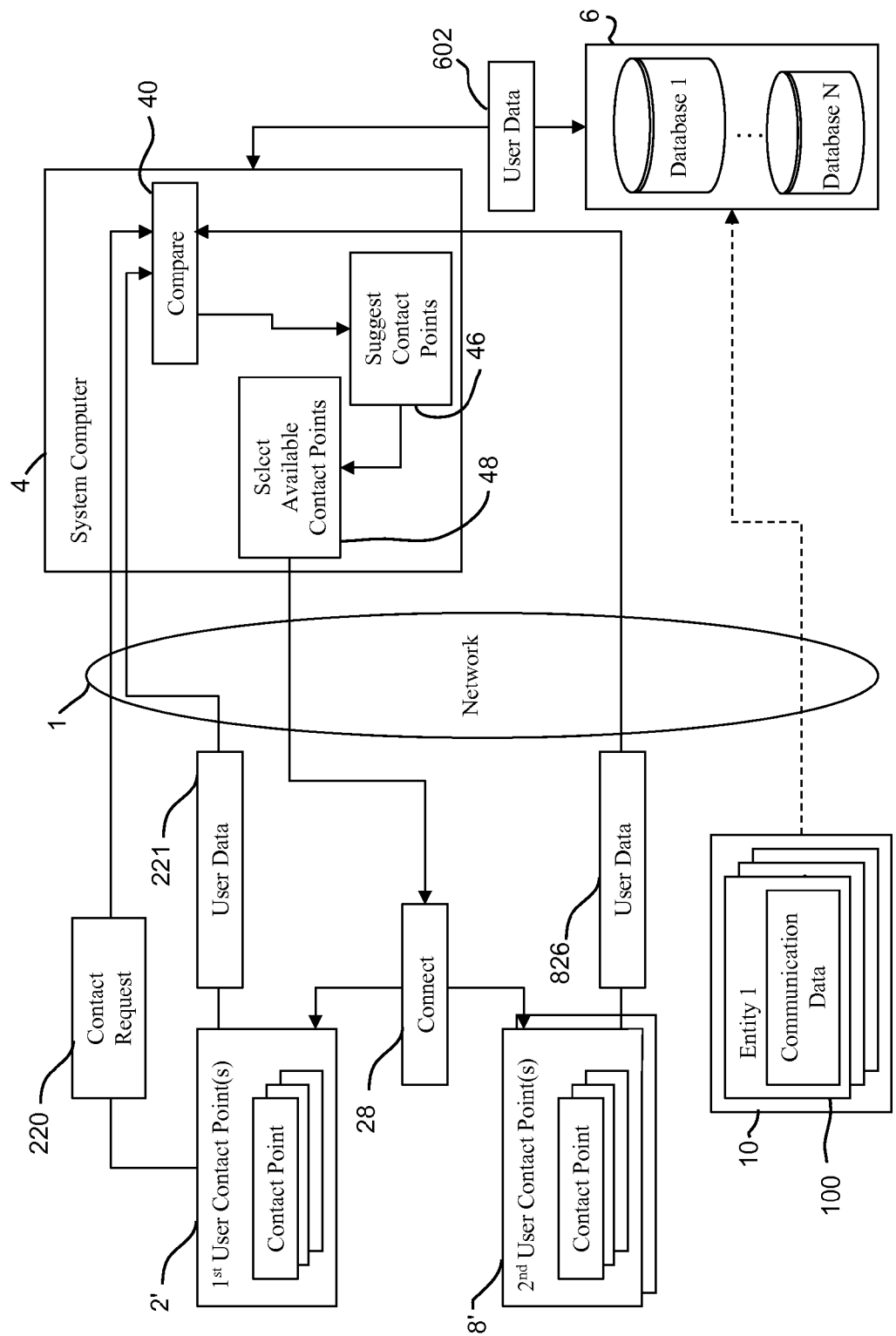
FIG. 6 is a block diagram showing aspects of the system in FIG. 1.

In FIG. 6 one example of an automatic connection is shown. The system computer 4 receives the contact request 220 and client user data 221 over the network 1. The contact request may be generated from one of the client contact points 2'. Further, the client user data 221 may be received continuously as the client's activity on various contact points changes. The contact request 220, client user data 221 and user data 826 are compared. In one aspect, contact points are suggested to the client or user and input is received from one or both individuals, in other aspects, the contact request includes a selection of types of contacts or specific contact points. The system computer selects 48 a contact point that is available for two users. The selected contact points 48 are then connected 28 to allow the client to contact the user. The system computer can also use historical user data 602 that may received from one or more databases 6. The historical user data 602 may be based in part on communication data 100 from one or more entities 10, which may be received over the network 1.

Certain subject matter or material may be inappropriate for certain types of contacts. For example if an important contract is won, and someone wishes to notify the team working on that project, regular or non-restricted email may be inappropriate, because e-mail can be forwarded. At the same time, if the team is large and in various locations, it would not be efficient to notify everyone working on the project one by one via telephone. Therefore, the system may be configured to display sensitive communications in a secure manner that prevents unauthorized or unnecessary disclosure. In some cases, the system may control or restrict the dissemination of e-mails. In other cases, encryption, passwords, time restrictions and other security settings may be used to restrict dissemination of sensitive information.

Figure 7:
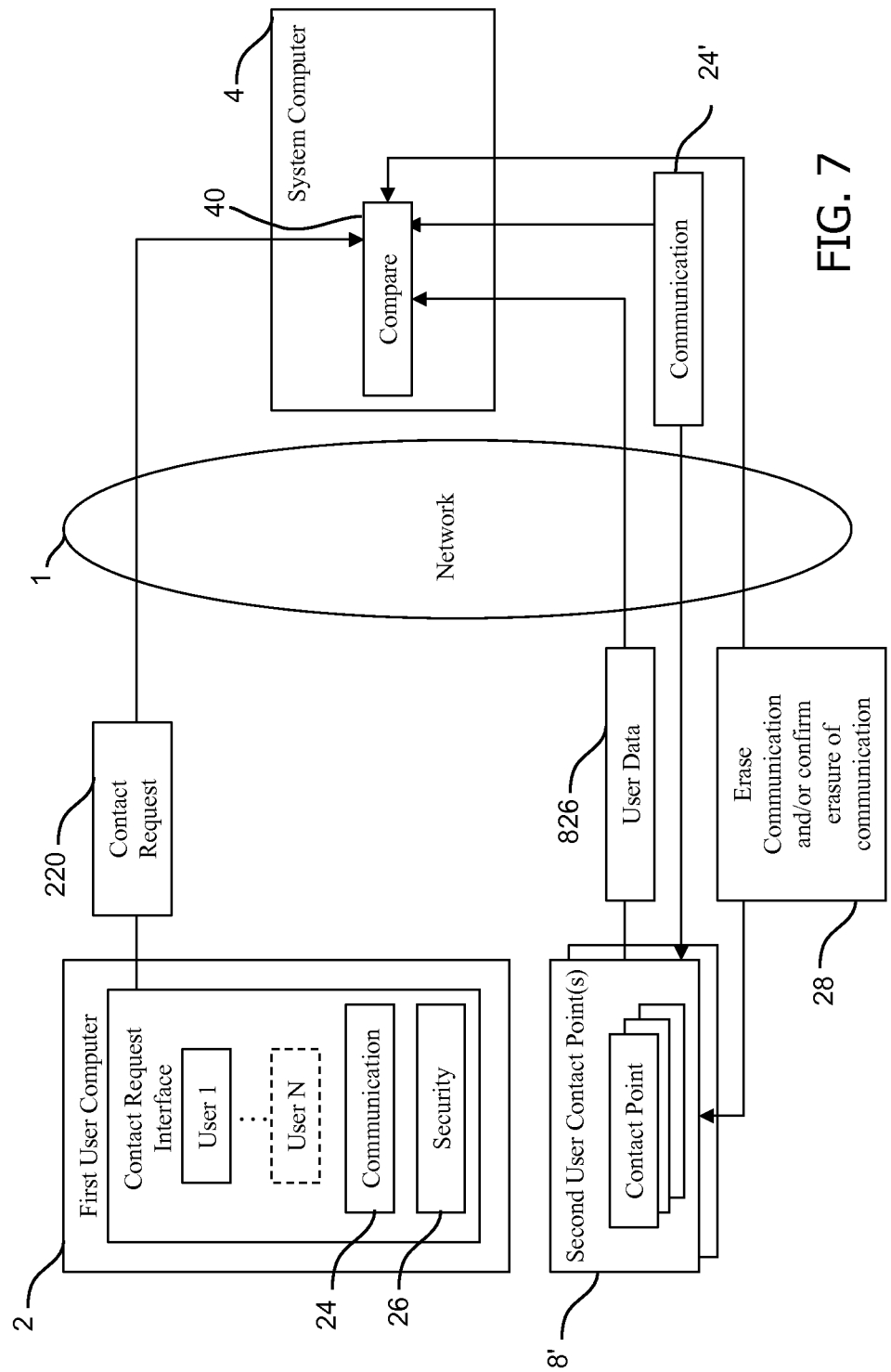
FIG. 7 is block diagram showing aspects of the system in FIG. 1.

In FIG. 7, the contact request 220 is generated through a client computer 2 having an interface. Part of the interface may allow for a communication 24 to be input. This communication may be text, video, audio, image and other or combinations thereof. A security selection 26 may also be included. The security selection may default to a certain security level based on length or content of the communication, the security selection can also be related to an amount of time a user is allowed to read a communication. The contact request 220 is received by the system computer 4 and compared to user data 826. The contact request can include a selection of multiple users. The user data can be received from one or more users, each having one or more contact points. When the user data indicates that a user is actively using a particular contact point, the communication 24' can be sent to that contact point. When the communication is sent, the system computer also can monitor that the communication was received. Based on the security setting 26, the communication can be erased or automatically destroyed after a security event. A security event can be an elapsed time. Further, the communication 24' may have certain security features that prevent forwarding and/or screen capture of the communication. These security features may monitor the content of e-mails in comparison to restricted communications to prevent dissemination of information to individuals without access to receive information concerning a particular matter.

The restriction can prevent a user from saving, printing, re-transmitting, screen capturing or otherwise preserving or forwarding information deemed sensitive. The restriction can be individual based. For example, employees who initially receive the restricted communication can be allowed to communicate amongst the group of employees receiving the first communication. The individual initiating the communication may have permission to add new individuals, however the system may be set to restrict communications initially marked as sensitive from dissemination outside the company. It is understood, however, that individuals acting as agents or having a confidential or privileged relationship with the company may be allowed to receive sensitive communications without restriction. For example, attorneys representing the company would be given permission to receive re-transmitted or forwarded messages. The individuals having the confidential or privileged relationship can be identified as having such permissions within the record associated with that individual or firm.

The location and/or availability of a user may be designated or shown on a map. In addition, during a phone conference, the location and photo of individuals may be presented to some or all users. The location and availability can be determined as discussed herein. In addition, when a particular individual is speaking, voice recognition may be used to determine who is speaking and then a display or a map can highlight or otherwise indicate who is speaking.

Although in some cases herein, the system is described as being used for one individual to contact another individual, the system can allow groups of individuals to connect with each other. For example, one individual may wish to contact a plurality of individuals, a plurality of individuals may wish to contact a single individual, or two or more groups may wish to contact each other. The specific group or individual makeup could depend on the contact request. In many cases, a user will be registered with the system, for example a user's contact points may be known to the system and therefore user data is accessible or stored by the system. In some cases a user could be an individual not known to the system, but the unknown user may still wish to communicate with a user in the system, for example by phone. In this case, the unknown user could attempt to dial a known user and if that user is unavailable, the system may suggest alternate contact points. At the same time, unknown calls may be blocked where appropriate. For example, telemarketers may be automatically routed away from contacting particular individuals. It is also understood that the system can be used to allow individuals who are not registered with the system to more efficiently communicate with registered users.

It is understood that the software and modules described herein may execute or be associated with on a variety of computers, devices and/or processors. For example a non-transitory computer-usable storage medium can be implemented to perform the steps or the features of the system and/or software discussed herein. The system, modules or software runs on a computer, a digital signal processor, a field-programmable gate array, an application-specific integrated circuit, a micro-processor, a micro-controller, or any other form of programmable hardware.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for routing communications from a first user to at least a second user, the system comprising:
    a system computer;
    an interface module associated with the system computer allowing the first user to access said system computer with a user computer;
    a contact module associated with said system computer and receiving a contact request from the user computer, the contact request indicative of a request to initiate a communication with a second user via one or more contact points;
    an activity module associated with said system computer and receiving second user data which is indicative of which of the one or more contact points can be used to contact the second user at a particular time; and
    a comparison module associated with said system computer and comparing the contact request and the second user data to determine which of the one or more contact points has the best chance to be available for the first user to use to communicate with the second user, wherein the communication is initiated based on the contact request.

2. The system of claim 1 further comprising a preferences module associated with said system computer and receiving user contact data associated with at least one second user contact point wherein the user contact data is indicative of the second user's contact preferences for the at least one second user contact point; and wherein said comparison module compares the user contact data to the contact request and the second user data.

3. The system of claim 2 wherein said comparison module determines a probability for a plurality of second user contact points, the probability indicative of the chance that the second user is available to be contacted at the particular second user contact point, the system further presenting to the first user a list of contact points based on the probabilities.

4. The system of claim 1 wherein said activity module receives first user data indicative of an activity status of at least one first user contact point and said comparison module transmits the first communication to the second user contact point when the activity status of the second user contact point and the activity status of the first user contact point both indicate that the second and first users are actively using their respective contact points.

5. The system of claim 1 further comprising:
    a communication module receiving a selection of at least one contact point for connecting the first user to the second user.

6. The system of claim 1 wherein the user computer and the system computer are in communication via a network connection.

7. The system of claim 1 wherein the contact request is indicative of at least one contact type that the first user would like to use to connect with the second user.

8. The system of claim 7 wherein at least one of the contact types is selected from the group consisting of: phone, voice, e-mail, instant message, video conference, sms, mms and social media.

9. The system of claim 1 wherein said activity module generates a pattern from the second user data, the pattern indicative of how and when one user uses contact points to communication with other users; and said comparison module compares the pattern to the contact request to determine which second user contact point is available.

10. The system according to claim 1 wherein a communication is routed to the second user contact point that has the best chance to be available.

11. A system for routing communications comprising:
    a system computer;
    software executing on said system computer for receiving user data which is indicative of one or more contact points that can be used to contact a user at a particular time;
    software executing on said system computer for receiving a contact request indicative of a request to initiate a communication with the user; and
    software executing on said system computer the contact request with the user data to determine which one of the one or more contact points can be used to contact the user at a select time associated with the contact request, wherein the communication is initiated based on the contact request.

12. The system of claim 11 further comprising:
    software executing on said system computer for receiving user contact data which is associated with a plurality of contact points, each contact point associated with at least one user, the user contact data including a user contact preference indicative of the user's preferences associated with at least one contact point; and
    said software for comparing the contact request with the user data further for comparing the contact request to the user contact preference to determine which of the plurality of contact points can be used to contact the user at the select time.

13. The system of claim 12 further comprising:
software executing on said system computer for generating a notification for transmission to the user;
software executing on said system computer for receiving a selection in response to each said notification, each selection indicative of a contact point that is available to be used to contact the user at the select time.

14. The system of claim 11 wherein a first user initiates the contact request; and wherein the user data includes first user data, which is indicative of contact points that can be used to contact the first user at a select time, the system further comprising:
said software executing on said system computer for comparing the contact request with the user data to determine which contact points for both the first user and the user are active and can be used to allow the first user and the user to contact each other at the select time.

15. The system of claim 11 further comprising:
software executing on said system computer for receiving first user data which is indicative of first user contact points that can be used to contact a first user at the select time;
software executing on said system computer for automatically selecting a second user contact point and a first user contact point, wherein the second user contact point has an activity status indicating that a second user is available at the second user contact point and the first user contact point has an activity status indicating that the first user is available at the first user contact point.

16. The system of claim 15 wherein the contact format is selected from the group consisting of: voice, video, instant message, social media, e-mail, MMS, and text.

17. The system of claim 15 further comprising:
software executing on said system computer for receiving a type selection indicative of at least one type of contact point;
software executing on said system computer for receiving a communication;
software executing on said system computer for comparing the user data to the category selection and for transmitting the communication to one of the contact points associated with the type of the type selection.

18. The system of claim 17 wherein the communication is transmitted to the one of the contact points according a user contact preference, the user contact preference indicative of a user's preferences associated with at least one contact point.

19. The system of claim 17 wherein the type selection is included within the contact request.

20. The system of claim 18 wherein the user contact preferences is indicative of a user's preferences associated with the type selection.

21. The system of claim 11 wherein the software executing on said system computer for comparing a contact request with the user data generates a list of available contact points, and the system further comprises:
software executing on said system computer for receiving a selection, the selection indicative of one of the available contact points;
software executing on said system computer for determining if a communication between two users was successful.

22. The system of claim 21 further comprising:
software executing on said system computer for receiving user contact data which is indicative of user contact preferences for at least one contact point associated with one of the users; and
said software for comparing the contact request with the user data further for comparing the contact request to the user contact preferences to determine which of the plurality of contact points can be used at the select time;
wherein the user contact preferences are updated based on whether or not the communication is refused.

23. The system of claim 11 further comprising:
software executing on said system computer for receiving user contact data which is indicative of user contact preferences for at least one contact point associated with one of the users;
software executing on said system computer for generating a pattern from the user data and the contact data;
software executing on said system computer for generating at least one rule based on the pattern, the rule transmitted to the user;
software executing on said system computer for receiving a selection in response to the rule, the selection indicative of if the user elects to accept, decline or postpone the at least one rule for updating the user contact preferences.

24. The system of claim 23 wherein said software for updating the user contact preferences transmits an update request to a user, the update request indicative of a suggested update to the user preferences the system further comprising:
software executing on said system computer for receiving a response to the update request.

25. The system of claim 11 further comprising:
software executing on a processor of a client computer for providing an interface, the interface for generating the contact request.

26. The system of claim 11 wherein at least a portion of the user data is received from a storage in communication with the system computer.

27. The system of claim 11 further comprising
software executing on a processor of a user computer for providing an interface, the interface for generating at least one user contact preference for transmission to said system computer.

28. A system for securely routing a communication from a first user to a group of users having one or more users therein, the system comprising:
a system computer having a network connection;
an interface module associated with said system computer and allowing the first user to access said system computer with a user computer;
a contact module associated with said system computer and receiving from the user computer: a contact request indicative of a request to initiate a communication with the group and at least a first communication;
an activity module associated with said system computer and receiving user data indicative of an activity status for each of at least one contact point, each contact point associated with a user in the group; and
a comparison module associated with said system computer and comparing the contact request and the activity status of each of the at least one contact point to transmit the first communication to each contact point having an activity status indicating that the user associated with the contact point is actively using the contact point, wherein the communication is initiated based on the contact request.

29. The system according to claim 28 further comprising:
a security module associated with said system computer and determining an at least one security parameter associated with the first communication, the security module restricting the first communication according to the security parameter.

30. The system of claim 29 wherein the security parameter is indicative of a time period the system further comprising;
a status module associated with said system computer and determining a start time indicative of when the second user has received the first communication wherein said security module restricts the first communication by erasing the first communication based on a comparison between the start time and the time period.

31. The system according to claim 30 wherein the time period is automatically determined based on a length of the first communication.

32. The system of claim 29 wherein the security parameter is indicative of a maximum number of users that are allowed to receive the first communication.

33. The system according to claim 30 wherein said security module automatically determines the time period based on a length of the first communication.

34. The system according to claim 31 wherein the security module prevents a user who receives the first communication from re-transmitting at least a part of the first communication.

35. The system according to claim 29 wherein the security module prevents content of the first communication from being transmitted to a third party user, wherein the third party user is a user other than the first user or a user in the group.

36. The system according to claim 29 wherein the security parameter is indicative of a permission to save.

37. The system according to claim 29 wherein the security parameter is indicative of a permission to print.

* * * * *